March 15, 1960     O. W. JOHNSON     2,928,592
PRESSURE CENTRIFUGE
Filed May 1, 1957
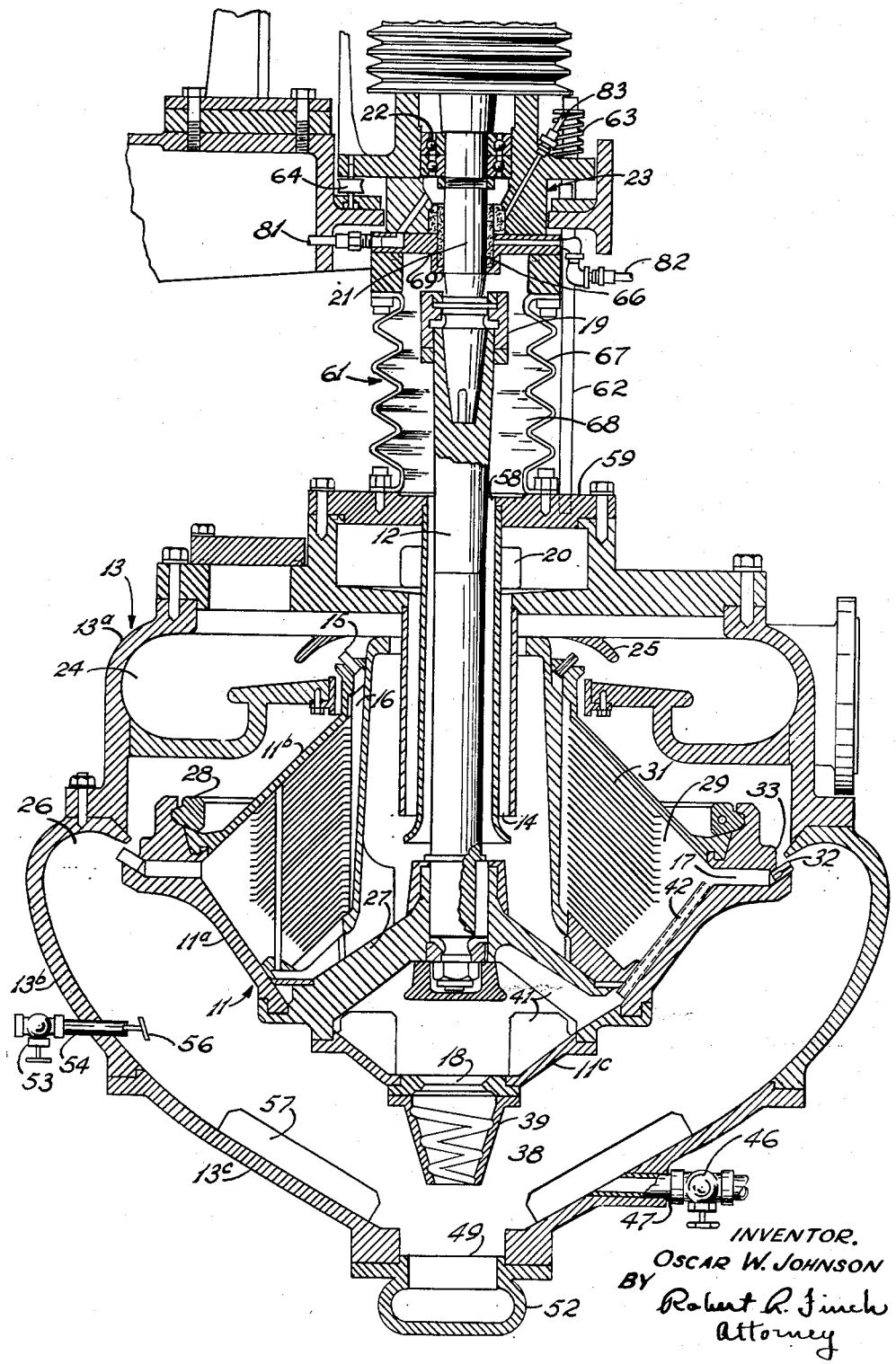
INVENTOR.
OSCAR W. JOHNSON
BY Robert R. Finch
Attorney United States Patent Office 2,928,592
Patented Mar. 15, 1960

2,928,592
PRESSURE CENTRIFUGE

Oscar W. Johnson, Houston, Tex., assignor to Dorr-Oliver Incorporated, Stamford, Conn., a corporation of Delaware Application May 1, 1957, Serial No. 656,425

4 Claims. (Cl. 233—46)

This invention relates generally to centrifuges of the type having a rotor suspended from a top mounted shaft and adapted to carry out, at elevated pressures, the continuous separation and discharge of separated overflow and underflow fractions from a feed material containing suspended particles. More particularly, the invention relates to improved ways and means enabling compensation for axial upward thrust exerted by pressure within such a centrifuge thereby to maintain stable operation even when such pressure exceeds the weight of the rotor.

In general, the invention relates to centrifuges of the type disclosed in Patents Nos. 1,923,454, 1,847,751 and 2,060,236 which comprise generally a rotor housing, a rotor suspended in such housing and mounted for rotation therein on a central shaft, said shaft being in turn journalled for rotation in bearings adjacent only its upper end. More specifically, the invention is directed to centrifuges as above discussed but adapted for operation under elevated pressures as disclosed in the co-pending application of Kenneth D. Lewis et al., Serial No. 624,524, filed November 27, 1956, which discloses a pressured centrifuge comprising generally a rotor housing, a rotor suspended in such housing, a flexibly mounted bearing spaced above such rotor housing in which the rotor shaft is mounted for rotation, and flexible sealing means interconnecting the bearings and housing. The bearing housing is flexibly mounted to allow slight undulous motion of the rotor and rotor shaft under conditions of rotor unbalance caused by momentary variations in feed distribution. The flexible sealing means, in combination with a shaft seal, provides means for maintaining pressure within the rotor housing.

In the above type of construction, the pressure maintained within the rotor housing creates a force which tends to destroy, in part, the rotational stability of the rotor and shaft assembly. This force acts in an upwardly direction at the bearing assembly and is proportional to the cross sectional area of the upper inner face of the flexible closure housing, the cross sectional area of the shaft and the operating pressure maintained within the rotor housing. The effect of this force is to tend to displace the rotor, rotor shaft and the bearing housing in an upwardly direction.

As previously mentioned, the bearing housing is flexibly mounted to allow for slight undulations of the rotor caused by temporary unbalance. Thus, this force, acting through the shaft and shaft seal housing, tends to cause the flexibly mounted bearing housing to be upwardly displaced and away from its resilient mountings. If the force so exerted is equal to or greater than the weight of the rotor and rotor shaft, the bearing housing will be displaced from the resilient mountings and the rotor will become free floating. Even if this force is not of great enough magnitude to equal the weight of the rotor and rotor shaft, the stability of the rotor still will be partially destroyed to a proportionate extent.

The flexible mounting of the bearing assembly incorporates a spring bias which acts to maintain the bearing housing seated on the resilient mountings. While it is theoretically possible to bias the housing with sufficiently heavy springs to exert a downward force to balance the upward force caused by the pressure within the rotor assembly, such method is not functionally sound in practice due to the enormity of the spring bias required. Further, such method would not have flexibility under conditions of varying operating pressures.

It is, therefore, an object of this invention to provide ways and means to offset, at least in part, the upward lifting force of confined pressures in the rotor housing.

A further object is to provide ways and means whereby the material undergoing treatment is employed to offset, at least in part, the above described upward forces.

A still further object is the provision of ways and means whereby energy imparted to the material during separation is utilized to create a downward force on the rotor and thus partially offset the undesirable effects of the upward force component.

A related object is the provision of apparatus and a method for operating same by which a mass of material undergoing treatment is maintained in the bottom of the rotor housing and is used to offset, at least in part, the upward force component of the pressure within the rotor housing while simultaneously providing a liquid bottom bearing to give axial support to the rotor and dampen oscillatory movement.

Other and more specific objects will become apparent from the following description read in connection with the accompanying drawing which forms a part of this specification, it being understood, however, that such description is illustrative only and is not to be taken as limiting the invention, the scope of which is defined by the appended claims rather than by the description preceding them.

In the drawing:

The single figure is a cross-sectional view, partially in elevation, illustrating a centrifuge incorporating the present invention.

The centrifuge illustrated in the drawing comprises generally a rotor 11 carried by a vertical shaft 12 and disposed within a stationary rotor housing 13. The machine is provided with a feed inlet 20, a feed passage 14, an overflow passage 16 for discharging a centrifugally separated lighter fraction, an underflow passage 17 for discharging a centrifugally separated underflow fraction, and a passage 18 for introducing a supplemental fluid material which may be heavier centrifugally separated discharge material or underflow. The rotor shaft 12 is connected by a coupling 19 to a vertical shaft 21 which is journalled for rotation in a bearing assembly 22 which is in turn housed in a flexibly mounted bearing housing 23, as more fully described hereinafter.

As is conventional, the rotor housing 13 can be conveniently formed of separable sections 13a, 13b, and 13c of which section 13a forms a volute chamber 24 for receiving separated overflow, and section 13b is formed to provide an annular chamber 26 for receiving centrifugally separated heavier or underflow material.

The body of rotor 11 can likewise be formed from a number of separable parts, including, in the embodiment illustrated, a main part 11a and upper and lower conical shaped parts 11b and 11c respectively. The main part 11a has an inner structure 27 which is attached to the lower end of rotor shaft 12. Parts 11a and 11b are retained together by suitable means such as an expansible clamping ring 28. Within the rotor 11 there is a separating chamber 29 in which is positioned a group or stack of separating discs 31 such as are commonly used in such centrifuges. Circumferentially spaced underflow dischage nozzles 32 are positioned on the outer peripheral wall 33 of main rotor portion 11a, each of such nozzles being provided with a discharge orifice directed upwardly with respect to the chamber 26 and preferably backwardly with respect to the rotation of rotor 11. The underflow fraction discharged into annular chamber 26 is collected in conical bottom chamber 38 adjacent the lower end of the rotor 11.

Continuous centrifuges, such as disclosed in Patents 1,923,454, 1,847,751, and 2,060,236, may be provided with means to return a portion of the separated underflow to the centrifuge rotor. Accordingly, the separated underflow fraction is collected in bottom chamber 38 of rotor housing 13c and may be partially returned to the rotor via orifice 18 through the action of screw type impeller 39. A conduit 47, valved as at 46, provides means for withdrawing controlled quantities of the underflow fraction from chamber 38. A valved conduit 52 provides means for introducing wash liquid into chamber 38 via orifice 49. Spray nozzles are positioned around the periphery of rotor housing 13b which serve to break up foam within chamber 38. For simplicity, only one spray nozzle 56 is herein shown, receiving liquid via conduit 54 which is valved as at 53.

To prevent an undesirable swirling movement of the collected underflow fraction within bottom chamber 38, there is provided in the lower part of rotor housing 13c a plurality of baffles or vanes 57. Such vanes are mounted in suitable manner on the wall of rotor housing portion 13c and extend substantially the entire height thereof. Such vanes operate in the manner disclosed in United States patent 2,625,321, and, as noted above, prevent swirling of the collected underflow fraction.

As previously noted, a portion of the underflow fraction and wash liquid in chamber 38 are pumped through orifice 18 by the action of screw impeller 39 and into the lower part of rotor 11c where the material is acted upon by radially extending vertical webs or vanes 41 which serve to impart rotational velocity to the material. Such material passes through spaces between webs 41 and then outwardly through return tubes or passages 42 to pass through main separating chamber 29 which communicates with discharge nozzles 32.

Overflow passage 16 is provided with a plurality of discharge nozzles 15 adjacent the upper end of upper rotor section 11b. Each of these nozzles 15 are provided with a discharge orifice directed upwardly with respect to volute chamber 24 and splash plate 25.

Bearing housing 23 is flexibly mounted on shafts 62 and resilient mountings 64 and is held in position by springs 63. This flexible mounting allows for eccentric movements of shaft 12 caused by slight inequalities of feed distribution in rotor 11. As this centrifuge is designed to operate under conditions of elevated pressures, it is necessary to seal shaft 21 between the bearing housing 23 and rotor housing 13. In the embodiment of this invention as illustrated in the figure, this is accomplished by means of a telescopic rubber hose 67. Thus, the elevated pressures within chamber 68, caused by the fact that it is in free communication with the rotor housing 13 via passage 58, are contained therein by flexible hose 67 and shaft seal 66. Other means for preventing the escape of elevated pressure may be used, such as described in the co-pending application of Kenneth D. Lewis et al., Serial No. 624,524, filed November 27, 1956.

Shaft seal 66 is mounted on shaft 21 and in bearing housing 23 in such a manner that it moves with the shaft and bearing housing during moments of eccentric movement of the shaft; thus, no undue strain is placed upon the bearing and it will not bind or wear to a greater extent than would be normally expected with a completely fixed shaft. Such a seal may be any one of a number of seals specifically made for such purpose, and may, for example, be a model ROTT/ROTT double face type of mechanical seal manufactured by Durametallic Corporation of Kalamazoo, Michigan.

Bearing oil may be supplied to the bearing assembly 22 in a conventional manner and drained out through conduit 81. Sealing fluid, under pressure, may be supplied to shaft seal 66 via a conduit 82 and discharged via a conduit 83.

In operation, pressures within rotor housing 13 will tend to lift bearing housing 23 from its resilient mountings 64, and act against the force of the springs 63. This force is proportional to the cross sectional area of the lower inner face 69 of bearing housing 23, the cross sectional area of shaft 21 and the pressure within the rotor housing. It can be seen that if this force is great enough, it may balance or even exceed the weight of the rotor, the shaft, and the spring bias. If the upward force becomes so sufficient, the rotor will be lifted off of the resilient mountings and much of the lateral stability of the rotor will be destroyed. Stated differently, when the rotor is mounted only adjacent its upper end and this upper mounting has no apparent weight due to a balance of upward pressure forces and the downward weight and spring forces, the rotor becomes free floating with but little stability in regard to upsetting lateral forces. Further, even though the upward forces are not so sufficient to equal or exceed the downward forces, it is apparent that the lateral stability of the rotor will be partially destroyed to a proportionately lesser extent. For this reason, it is necessary to compensate for these upward components of force occasioned by the operating pressures in this type of pressure centrifuge.

The present invention partially overcomes the upward pressure force components through proper disposition and utilization of both the overflow and the underflow fractions. As previously mentioned, overflow nozzles 15 and underflow nozzles 32 are positioned to discharge upwardly against the lower surface of splash plate 25 and the upper inner surface of annular receiving chamber 26 respectively. Thus, the kinetic energy of the overflow and underflow fractions are utilized to create forces acting in a downwardly direction and opposed to the lift forces occasioned by the pressures within the rotor housing.

A third compensating force is established by the action of impeller 39. As this impeller functions to pump liquid from lower chamber 38 into lower rotor section 11c, a downward force component with respect to the rotor will be developed and tend to offset the upward forces of the pressure within the rotor housing. Also, since impeller 39 is partially submerged in the liquid at the bottom of chamber 38, it will tend to act as a bottom liquid bearing and thus have a stabilizing effect on rotor 11.

I claim:

1. Apparatus for the centrifugal separation at substantially higher than atmospheric pressures of feed material into a lighter overflow fraction and a heavier underflow fraction comprising a rotor, a rotor housing, a rotor shaft, and a rotor shaft bearing assembly; said rotor housing comprising a vessel surrounding said rotor and adapted to contain substantially higher than atmospheric pressures; said rotor housing having an overflow receiving section, an underflow receiving section, and an opening to accommodate said rotor shaft; said rotor being supported by said rotor shaft and comprising feed material inlet means, underflow discharge means, and overflow discharge means; said rotor shaft being journaled for rotation at one of its ends in said bearing assembly, said rotor shaft extending vertically from said bearing assembly through said opening in said rotor housing and into said rotor housing, said rotor shaft being fixedly attached to said rotor adjacent the other one of its ends; flexible sealing means adapted to contain substantially higher than atmospheric pressures surrounding said rotor shaft fixedly attached in sealing relationship at one of its ends to said housing and fixedly attached in sealing relationship at its other end to said bearing assembly; said bearing assembly being spaced from said rotor housing and yieldably mounted to enable axial movements of said rotor shaft in relationship to said rotor housing; the improvement which comprises jet means associated with said underflow discharge means peripherally mounted on said rotor and positioned to discharge said underflow fraction in a direction that will create an axial thrust on said rotor shaft away from the bearing assembly of said rotor shaft.

2. Apparatus according to claim 1 in which jet means are associated with said overflow discharge means mounted on said rotor and positioned to discharge said overflow fraction in a direction that will create an axial thrust on said rotor shaft away from the bearing assembly of said rotor shaft.

3. Apparatus according to claim 1 in which said bearing assembly is at the upper axial extent of said rotor shaft.

4. Apparatus according to claim 3 in which a liquid impeller is fixedly mounted adjacent the lower end of said rotor, said liquid impeller extending into said underflow receiving section of said rotor housing and being adapted to impel a portion of the underflow fraction from the bottom section of said rotor housing into said rotor.

References Cited in the file of this patent

UNITED STATES PATENTS

| | | |
|---|---|---|
| 1,847,751 | Coe | Mar. 1, 1932 |
| 1,923,454 | Peltzer et al. | Aug. 22, 1933 |